United States Patent [19]

Arsenault

[11] Patent Number: 5,043,394

[45] Date of Patent: Aug. 27, 1991

[54] SULFENYL CHLORIDE ADDUCTS OF HYDROGENATED NITRILE RUBBER

[75] Inventor: Gilles J. Arsenault, Courtright, Canada

[73] Assignee: Nova Petrochemicals Inc., Sarnia, Canada

[21] Appl. No.: 487,271

[22] Filed: Mar. 2, 1990

[51] Int. Cl.$^5$ ............................................. C08F 8/34
[52] U.S. Cl. ............................ 525/329.3; 525/338; 525/339; 525/343
[58] Field of Search ................................. 525/329.3

[56] References Cited

U.S. PATENT DOCUMENTS 4,230,837 10/1980 Brois et al. ................. 525/329.3
4,464,515 8/1984 Rempel et al. .
4,631,315 12/1986 Buding et al. .

*Primary Examiner*—Bernard Lipman
*Attorney, Agent, or Firm*—Stevens, Davis, Miller & Mosher

[57] ABSTRACT

The present invention provides an adduct of a hydrogenated nitrile rubber and a sulfenyl chloride.

The adducts are characterized by having a surprisingly low level of gel, as determined by the amount of adduct which is insoluble in methyl ethyl ketone after 16 hours at 30° C.

The adducts may be vulcanized and used to prepare seals, gaskets or mechanical goods.

6 Claims, No Drawings

SULFENYL CHLORIDE ADDUCTS OF HYDROGENATED NITRILE RUBBER

FIELD OF THE INVENTION

This invention relates to an adduct of a hydrogenated nitrile rubber and a sulfenyl chloride, which adduct is characterized by having a surprisingly low level of insoluble gel.

BACKGROUND OF THE INVENTION

In general, hydrogenated nitrile rubber is produced by the catalytic hydrogenation of the carbon-carbon double bonds contained in nitrile rubber. Vulcanizates of hydrogenated nitrile rubber are known to have excellent resistance to ageing in hot air or hot oil.

It is known to chemically modify hydrogenated nitrile rubber so as to produce a material having characteristics which are particularly well suited for a particular application. For example, U.S. Application Ser. No. 291,964 (filed 30 Dec. 1988, now U.S. Pat. No. 4,879,352) teaches the preparation of hydrogenated nitrile rubber having oxazoline functionality and U.S. Application Ser. No. 239,783 (filed 16 Sept.1988, now U.S. Pat. No. 4,868,881) teaches the preparation of an adduct of hydrogenated nitrile rubber and a halogen.

The modification of hydrogenated nitrile rubber often leads to a polymer which has a high gel content (i.e. as measured by the amount of polymer which is insoluble in methyl ethyl ketone). Polymers having high gel content are normally considered undesirable because they do not mix well with compounding ingredients and because they are difficult to vulcanize.

It is an object of the present invention to prepare an adduct of a hydrogenated nitrile rubber and a sulfenyl chloride, which adduct is characterized by having a gel content of less than 15 per cent.

SUMMARY OF THE INVENTION

The present invention provides an adduct of a sulfenyl chloride and a hydrogenated nitrile rubber, wherein said adduct is characterized by having a gel content of less than 15 weight per cent as determined by the present adduct insoluble in methyl ethyl ketone after 16 hours at 30° C.

DETAILED DESCRIPTION

Nitrile rubber is a well known article of commerce which is typically prepared by the free radical initiated, emulsion polymerization of a $C_3$ to 5 $\alpha,\beta$-unsaturated nitrile and a $C_{4\ to\ 6}$ conjugated diene. Nitrile rubber has carbon-carbon double bond unsaturation resulting from the incorporation of the conjugated diene units. Acrylonitrile-butadiene rubber is a commercially available example of nitrile rubber.

As used herein, the term "hydrogenated nitrile rubber" refers to the product which is obtained by hydrogenating the carbon-carbon unsaturation of nitrile rubber until the remaining level of double bond unsaturation is less than 10 mole per cent. Preferred hydrogenated nitrile rubber has less than 5 mole per cent double bond unsaturation and is most preferably prepared by hydrogenating an acrylonitrile-butadiene rubber. In particular, the preferred acrylonitrile-butadiene rubber contains (prior to hydrogenation) 18 to 50 weight per cent acrylonitrile units (especially from 25 to 45 weight per cent acrylonitrile units) with the balance to 100 weight per cent consisting of butadiene units.

Hydrogenated nitrile rubber may be produced by the catalytic hydrogenation of a solution of nitrile rubber. Hydrido tetrakis (triphenylphosphine) rhodium (I), for example, is a suitable hydrogenation catalyst for nitrile rubber. Detailed descriptions of nitrile rubber hydrogenation processes are provided in U.S. Pat. Nos. 4,464,515 and 4,631,315, the disclosures of which are incorporated herein by reference.

Hydrogenated nitrile rubber is commercially available under the trademarks THERBAN ® (from Bayer, of Leverkusen, West Germany), ZETPOL ® (from Nippon Zeon, Japan) and (produced by Polysar, in Orange, Tex., U.S.A.).

The present invention relates to certain adducts of a hydrogenated nitrile rubber and a sulfenyl chloride.

The term "sulfenyl chloride" is meant to refer to its conventional meaning, namely a compound represented by the formula RSCl where S is sulfur, Cl is chlorine and R is an organic moiety.

It is preferred to utilize a sulfenyl chloride in which the organic moiety R contains from 8 to 30 carbon atoms, because a sulfenyl chloride having a lower molecular weight tends to provide a foul smelling adduct and a sulfenyl chloride having a higher molecular weight is difficult to utilize. The organic moiety R may suitably be fluoro substituted.

The structure of the organic moiety R is also of some significance. It is especially preferred to utilize a sulfenyl chloride in which the sulfur atom is chemically bonded to a primary carbon atom, because this structure has been observed to generally provide adducts having a low gel content.

Highly preferred sulfenyl halides for use in the present invention are alkyl sulfenyl halides and perfluoroalkyl sulfenyl halides.

While not wishing to be bound by any theory, it is believed that the sulfenyl chloride reacts with residual carbon-carbon double bond unsaturation in hydrogenated nitrile rubber as follows:

RSCl + 

(I)

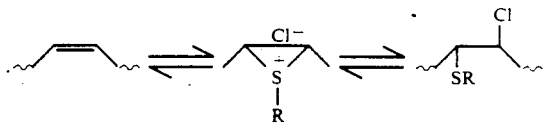

Formula (I) suggests that an analogous sulfenyl bromide (i.e. RSBr) should provide a similar result. However, sulfenyl bromides are not suitable for use in the present invention because, for reasons which are not understood, it was not found possible to prepare an adduct of hydrogenated nitrile rubber and a sulfenyl bromide which had a low gel content.

Formula (I)also indicates that the preparation of the adducts of the present invention eliminates some of the residual double-bond unsaturation contained in the hydrogenated nitrile rubber. However, it is highly desirable that the present adducts contain some residual double-bond unsaturation to provide sites which facilitate vulcanization. Accordingly, the adducts of the present invention should contain from 0.05 to 0.9 moles of sulfenyl chloride per mole of double bond unsaturation which was originally contained in the hydrogenated nitrile rubber.

Sulfenyl chlorides may be readily and conveniently prepared according to methods which are widely reported in the literature. The chlorination of thiols and the cleavage of disulfides with chlorine are two well known methods to prepare sulfenyl chlorides.

The adducts of the present invention may be conveniently prepared by mixing a suitable sulfenyl chloride with a solution of hydrogenated nitrile rubber. The adducts may be mixed with conventional rubber compounding ingredients and vulcanized. It is especially preferred to utilize adducts having less than 5 weight % gel to facilitate the compounding and vulcanization processes.

Further details of the invention are given in the following examples, in which all references to parts and percentages are by weight, unless otherwise indicated.

EXAMPLE 1

Sulfenyl chlorides were prepared by reacting chlorine with a thiol or disulfide of the type indicated in Table 1.

The procedure used to prepare the sulfenyl chlorides is described below.

A solution of chlorine in carbon tetrachloride (solution concentration = 3.5 g $Cl_2$/100 ml $CCl_4$) was added under a nitrogen atmosphere to a 3 necked, 500 ml flask in the quantity indicated in Table 1.

A solution of thiol or disulfide in $CCl_4$ was then added dropwise to the 500 ml flask. The contents of the flask were then stirred under a nitrogen atmosphere at room temperature for 30 minutes.

The thiol (or disulfide) solution contained 50 ml of $CCl_4$ and the quantity of thiol or disulfide indicated in Table 1. The contents of the flask were then stirred under a nitrogen atmosphere at room temperature for 30 minutes. Excess chlorine was removed from the system by exposing the flask contents to a vacuum (10-15 mm Hg). The resulting sulfenyl chloride was then used in the preparation of hydrogenated nitrile rubber adducts, as described in Example 2.

TABLE 1

| Experiment | Thiol or Disulfide | Quantity of Thiol or Disulfide (g) | Quantity of $Cl_2$/$CCl_4$ solution (ml)[a] |
|---|---|---|---|
| E-35 | $C_{18}H_{37}SH$ | 10.5 | 100 |
| E-45 | $(HO_2CCH_2CH_2S)_2$ | 4.4 | 75 |
| E-65 | $MeOC_6H_4CH_2SH$ | 5.7 | 100 |
| E-72 | $C_6F_{13}C_2H_4SH$ | 13.9 | 100 |
| E-81 | $(MeO)_3Si(CH_2)_3SH$ | 7.2 | 100 |
| E-102 | $C_6H_4(NOC)SH$ | 5.8 | 100 |

TABLE 1-continued

| Experiment | Thiol or Disulfide | Quantity of Thiol or Disulfide (g) | Quantity of $Cl_2$/$CCl_4$ solution (ml)[a] |
|---|---|---|---|
| E-122 | $(HO_2CCH_2CH_2S)_2$ | 2.4 | 50 |

Notes:
[a] solution concentration = 3.5 g $Cl_2$/100 ml $CCl_4$

EXAMPLE 2

This example illustrates the preparation of adducts of hydrogenated nitrile rubber and sulfenyl chloride.

Two types of hydrogenated nitrile rubber were used in the experiments of this example. The hydrogenated nitrile rubber noted as A in Table 2 was prepared from an acrylonitrile/butadiene rubber (38% acrylonitrile/62% butadiene) and was hydrogenated to the extent that it contained only 9 mole % carbon-carbon double bond unsaturation. The hydrogenated nitrile rubber noted as B in Table 2 was also prepared from a similar starting acrylonitrile/butadiene rubber (35%/62%) but was hydrogenated to a greater extent (such that it only contained b 4 mole % carbon-carbon unsaturation).

Adducts of HNBR and sulfenyl chloride were then prepared according to the following procedure.

A rubber solution containing 10 grams of hydrogenated nitrile rubber and 140 grams of monochlorobenzene was prepared and added to a 500 ml flask. While stirring the rubber solution at approximately 500 revolutions/minute, a solution of sulfenyl chloride in $CCl_4$ (as described in Table 2) was added to the flask. Solutions which were not visibly gelled were worked up by coagulation with methanol and drying under vacuum.

The gel content of an adduct was indirectly determined by measuring the solubility of the adduct in methyl ethyl ketone ("MEK"), as indicated by the formula:

$$\text{gel content} = 100\% - \left( \begin{array}{c} \% \text{ of adduct soluble in MEK after} \\ 16 \text{ hours at } 30° \text{ C.} \end{array} \right)$$

Table 2 shows that the adducts of Experiments 4, 5, 6, 9, 10, 11, 12, 13 and 14 contain more than 15 weight % gel and hence are outside the scope of the present invention. Conversely, the adducts of Experiments 1, 2, 3, 7, 8 and 15 have surprisingly low gel levels.

The amount of carbon-carbon unsaturation remaining in the adducts, as determined by infra-red spectroscopy, is also shown in Table 2.

The amount of chlorine, sulfur and fluorine (where applicable) of some of the adducts was determined by elemental analysis. The adduct of Experiment 7 was found to contain 5.2% Cl, 2.4S and 14.6% F. The adduct of Experiment 8 was found to contain 1.4% Cl, 1.7% S and 5.8% F.

TABLE 2

| Experiment | Rubber Type | Thiol[1] or Disulfide | Quantity of Thiol or Disulfide (moles) | Unsats (mole %) | Gel (wt. %) |
|---|---|---|---|---|---|
| 1 | A | $C_{18}H_{37}SH$ | 0.0198[2] | 0.3 | <1 |
| 2 | A | " | 0.0086[2] | 2.4 | <1 |
| 3 | B | " | 0.0086[2] | 0.4 | <1 |
| 4-c | A | $(HO_2C(CH_2)_2S)_2$ | 0.0231[2] | 2.4 | gel |
| 5-c | B | " | 0.0139[2] | 0.5 | gel |
| 6-c | A | $MeOC_6H_4CH_2SH$ | 0.0113[2] | n.m. | gel |
| 7 | A | $C_6F_{13}C_2H_4SH$ | 0.0169[3] | 0.2 | 3.2 |
| 8 | B | " | 0.0100[3] | 0.2 | 3.6 |

TABLE 2-continued

| Experiment | Rubber Type | Thiol[1] or Disulfide | Quantity of Thiol or Disulfide (moles) | Unsats (mole %) | Gel (wt. %) |
|---|---|---|---|---|---|
| 9-c | A | $(MeO)_3Si(CH_2)_3SH$ | $0.0148^2$ | n.m. | gel |
| 10-c | B | " | $0.0148^2$ | n.m. | gel |
| 11-c | B | " | $0.0185^2$ | n.m. | gel |
| 12-c | B | $C_6H_4(NOC)SH$ | $0.0025^2$ | n.m. | gel |
| 13-c | B | " | $0.0013^2$ | 2.4 | 72.7 |
| 14-c | B | " | $0.0013^2$ | n.m. | 66.7 |
| 15 | B | $(HO_2C(CH_2)S)_2$ | $0.0040^2$ | 2.1 | 3.4 |

Notes:
c = comparative
[1] used to prepare the sulfenyl halide
[2] added as a solution in 50 ml $CCl_4$
[3] added as a solution in 100 ml $CCl_4$
"n.m." - not measured
"gel" - grossly gelled
"<1" - less than 1 weight %

What is claimed is:

1. An adduct of a sulfenyl chloride and a hydrogenated nitrile rubber, said hydrogenated nitrile rubber being prepared by the hydrogenation of an acrylonitrile-butadiene copolymer containing from 25 to 45 weight per cent of acrylonitrile, wherein said adduct is characterized by having a gel content of less than 15 weight per cent, as determined by the per cent adduct insoluble in methyl ethyl ketone after 16 hours at 30° C. and further characterized in that said sulfenyl chloride is selected from alkyl sulfenyl chloride and perfluoroalkyl sulfenyl chloride.

2. The adduct of claim 1 wherein said sulfenyl chloride contains from 8 to 30 carbon atoms.

3. The adduct of claim 2 wherein the sulfur atom of said sulfenyl chloride is bonded to a primary carbon atom.

4. The adduct of claim 1 which contains less than 5 per cent gel.

5. The adduct of claim 1 which contains from 0.05 to 0.9 moles of sulfenyl chloride per mole of double bond unsaturation originally in the hydrogenated nitrile rubber.

6. The adduct of claim 1 wherein the hydrogenated nitrile rubber contains less than 10 mole per cent of double bond unsaturation.

* * * * *